United States Patent [19]

Schaut et al.

[11] 4,086,761
[45] May 2, 1978

[54] STATOR BYPASS SYSTEM FOR TURBOFAN ENGINE

[75] Inventors: Larry Allen Schaut, Seattle; Richard Alan Zimbrick, Federal Way, both of Wash.

[73] Assignee: The Boeing Company, Seattle, Wash.

[21] Appl. No.: 679,946

[22] Filed: Apr. 26, 1976

[51] Int. Cl.² .............................................. F02K 3/06
[52] U.S. Cl. ..................................... 60/226 R; 60/262
[58] Field of Search ................ 60/226 R, 262, 224, 60/39.07, 39.27; 415/144, 145, 28, 119

[56] References Cited

U.S. PATENT DOCUMENTS

| | | | |
|---|---|---|---|
| 3,167,911 | 2/1965 | Sandre | 415/145 |
| 3,735,593 | 5/1973 | Howell | 60/226 R |
| 3,747,341 | 7/1973 | Davis | 415/145 |
| 3,809,490 | 5/1974 | Harner | 415/28 |
| 3,898,799 | 8/1975 | Pollert et al. | 415/145 |
| 4,012,165 | 3/1977 | Kraig | 60/226 R |

Primary Examiner—Robert E. Garrett
Attorney, Agent, or Firm—Al Richardson; B. A. Donahue

[57] ABSTRACT

A nacelle for use with a turbofan engine for reducing both rotor and stator source noise emitting from the engine. The nacelle contains a ducted system which when in operation bypasses a portion of the flow in the fan duct around the fan stators causing unloading of the rotor, diffusion of the flow between the rotor and the stators, a reduction in the viscous flow at the rotor tips, and a substantial elimination of the rotor tip flow. Flow enters the duct system through openings in the interior walls of the nacelle located between the rotor and fan stators but downstream of the rotor at least a certain predetermined minimum distance. Flow through the system is controlled by doors or other means and it is normally operated only during approach and take-off, thus minimizing cruise penalty on engine performance.

14 Claims, 14 Drawing Figures

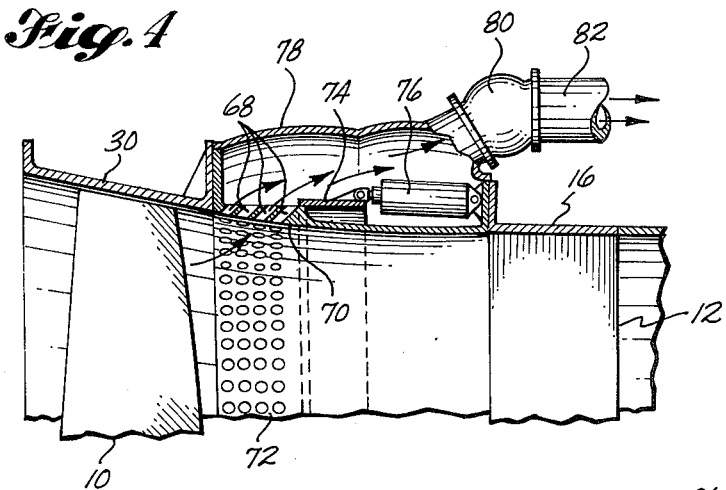
Fig. 4
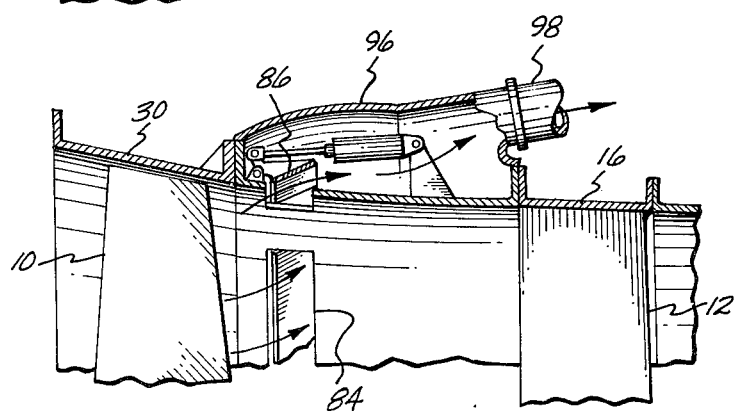
Fig. 5
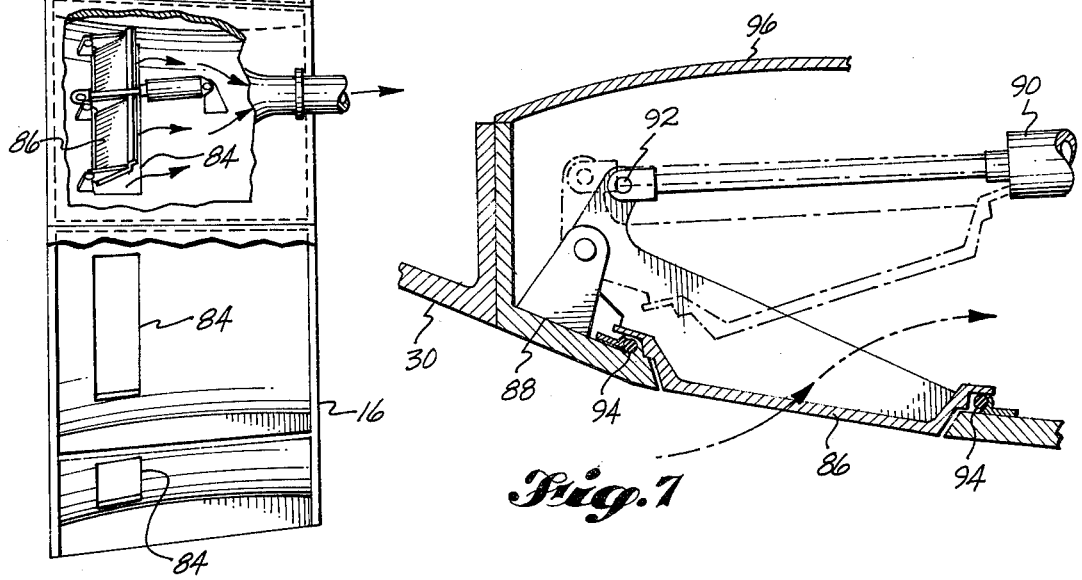
Fig. 6
Fig. 7

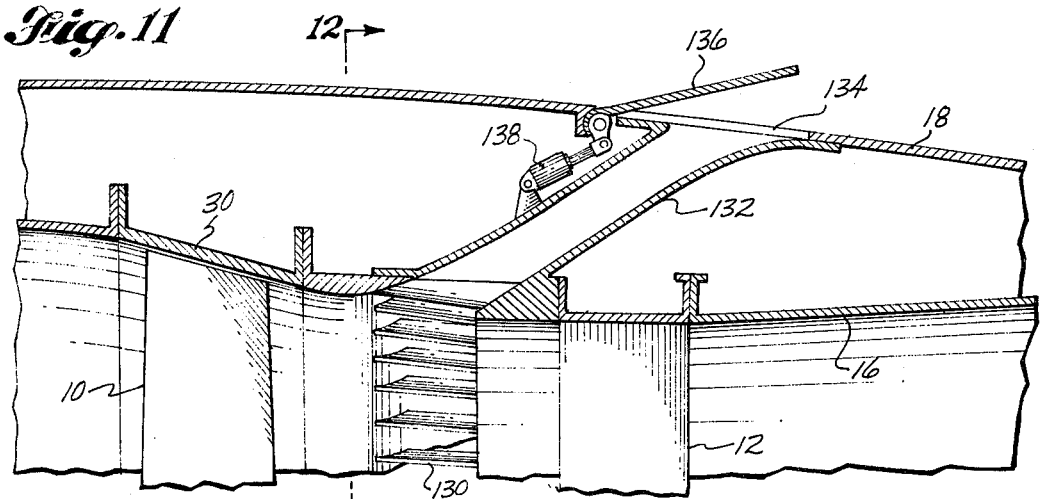
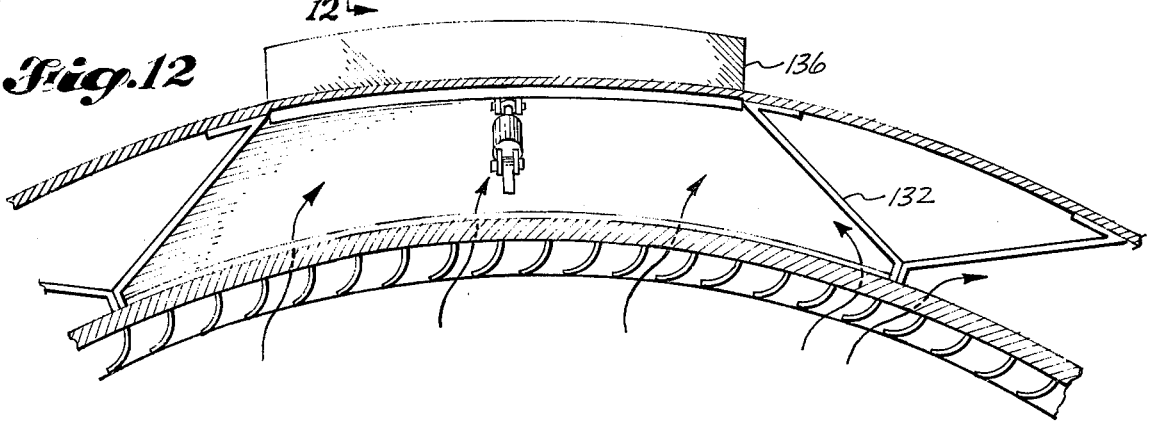
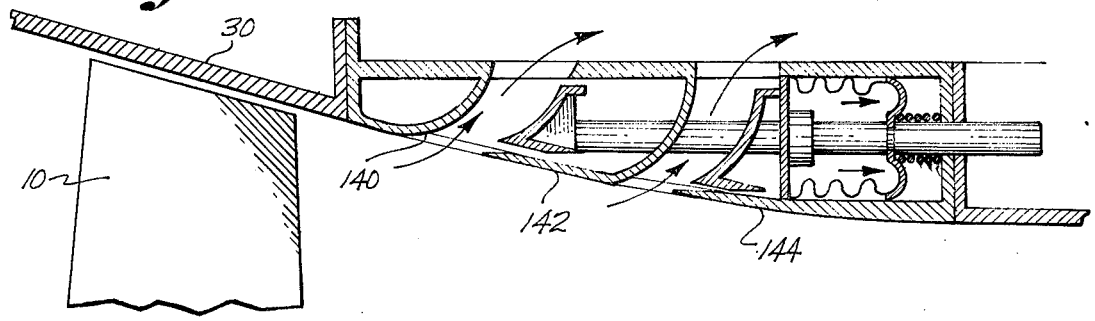
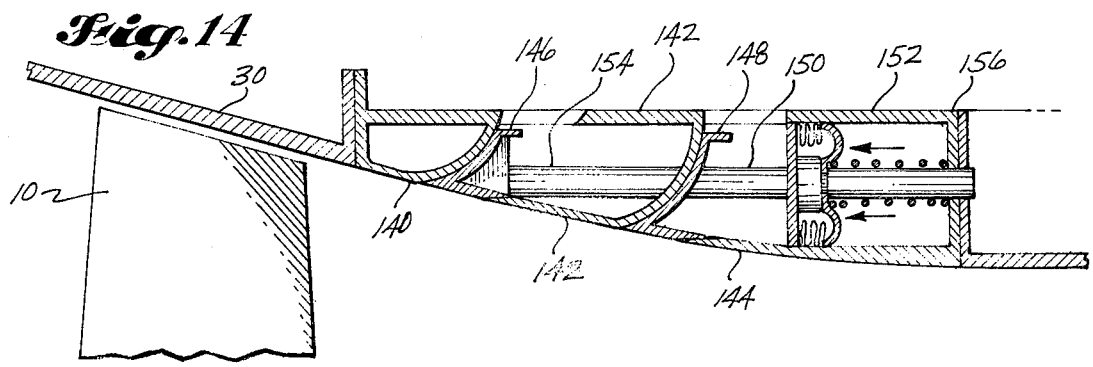

STATOR BYPASS SYSTEM FOR TURBOFAN ENGINE

BACKGROUND OF THE INVENTION

This invention relates generally to noise reduction devices for turbofan engines and more specifically to a device for simultaneously reducing rotor and stator source noise from the fan stage of a turbofan engine.

In the recent efforts to reduce the noise emitted from jet engines considerable attention has been given to the fan stages of modern high bypass ratio turbofan engines. The two primary noise sources in these fan sections are known to be the fan rotor, and fan stators. In the effort to reduce the noise generated by these components, it has been necessary to first attempt to find the relative importance of the rotor and stator sources, and second, to attempt to define and understand the mechanisms by which the noise is generated.

Until recently most experiments were formed to investigate fan stage noise in static tests performed on the ground and the results were contaminated by poor fan inflow which was not representative of actual flight conditions. In such static tests atmospheric disturbances and obstructions in the fan inflow cause unsteady velocities that interact with the rotor and generate noise peculiar to the particular static test arrangement. The information gained from these tests relating to fan and stator noise has been somewhat misleading. For example, on the basis of such tests it has been generally concluded that noise from the rotor is dominating in the area in front of the engine whereas aft of the engine rotor and stator noise are of equal significance. It appeared then from these older tests that in order to reduce noise in the far field in front of the engine, efforts should be concentrated on the more difficult task of reducing fan noise.

In recent tests, however, the inflow to the fan has been controlled to better simulate in flight conditions and the results have indicated that noise from the stator is more important in the forward arc than previously believed. The tests have indicated that when the fan is operating at subsonic relative tip speeds, simulating engine operating conditions during a landing approach, the noise from the stator contributes significantly to the total noise in the forward arc. In fact, these tests have indicated that for relative fan tip speeds up to approximately sonic speed, stator noise is quite significant in the forward arc. At higher tip speeds, rotor blockage effects on forward radiated stator noise is sufficient that the fan noise dominates.

In the effort to reduce noise generated by the rotor, considerable attention has been focused on the region near the rotor tips. It is recognized that this region is a major source of noise because of the high tip speeds, the interaction of the rotor with the inlet boundary layer and secondary flows from the tips. Investigators in the past have attempted to reduce rotor tip noise by removing the inlet boundary layer just upstream of the rotor, reducing inflow distortion, and reducing some of the rotor tip secondary flows. Typical of these efforts are the devices described by C. J. Moore in U.S. Pat. No. 3,730,639 and A. R. Howell in U.S. Pat. No. 3,735,593.

Stator generated noise on the other hand is generally attributed to rotor-induced unsteady velocities interacting with the stator vanes. The major sources of these unsteady velocities are wakes from the rotor blades and secondary flow from the rotor tip and hub regions. Further, stator tone noise is thought to be due to the harmonic content of these unsteady velocities, and the broadband noise due to random variations. Much theoretical and experimental work has been done in analyzing the effect of the rotor wakes on the stators, but relatively little effort has been made in investigating the effect of rotor tip flow on them. A recent study of the subject suggests that secondary flows originating from the tips and roots of the rotor blades may be more significant in the stator noise problem than the rotor wakes. The present invention was made by the inventors in the course of their efforts to apply these recent theories and test results to achieve a reduction in fan stage noise.

By this invention a moderate to high bypass ratio turbofan engine is enclosed in a nacelle having a controllable duct system which has openings around the periphery of the fan casing. When the ducts are open, a small percentage of the flow in the region after the rotor and relatively near the inner nacelle surface is passed through the openings into the duct system and it is exhausted into the atmosphere. This portion of the flow is thus made to bypass the fan stators and has accordingly been referred to as a stator bypass system. When in operation the stator bypass system reduces both direct rotor and rotor/stator interaction noise by (1) unloading the rotor, (2) reducing secondary or viscous flow at the rotor tips, (3) causing a diffusion of the flow between the rotor and stators, and (4) bypassing a substantial portion of the rotor tip flow around the stators.

The term rotor unloading means a reduction in the back pressure downstream of the rotor resulting from an increase in the effective secondary nozzle exit area. Unloading causes an increase in the mass flow through the rotor and a decrease in the rotor pressure ratio. Also, the incidence angle of the rotor blades is decreased and the relative mach number is increased. Unloading of the rotor moves the rotor operating point away from the stall line thus reducing rotor secondary flows and improves rotor stability. In addition, the velocity deficit of rotor wakes is decreased which in turn causes a reduction in the inflow velocity variations at the stator.

The second effect of this invention is to reduce viscous flow in the region of the rotor tips. When the stator bypass system is in operation, the flow field upstream of the bypass duct openings in the region of the rotor tips is accelerated. The amount of acceleration depends upon the flow conditions behind the rotor, the geometry of the duct openings, and the ambient static pressure. Due to this acceleration in the rotor tip region, the effects of viscous flow rotor tip secondary flows, and rotor sensitivity to inflow velocity variations are reduced.

A further effect of the stator bypass system is to cause a diffusion of the flow between the rotor and stators. The principal effect of this diffusion is to reduce the mean flow velocity at the leading edges of the stator blades. Both the axial and rotational components of the mean flow velocity are reduced so that the stator incidence angle remains closer to design condition than would result if the fan were unloaded by simply increasing the secondary nozzle exit area aft of the stators. Other effects of the diffusion include an increase in the "reduced frequency" of the rotor wake/stator interaction and a reduction in the wake velocity deficit.

Another important effect of the stator bypass system is that it diverts substantial portion of the highly turbulent flow from the rotor tips including the tip vortices, into the bypass duct system, thus preventing this flow from striking the stators. Accordingly, the noise that would be generated by the interaction of this turbulent flow with the stator blades is substantially eliminated.

This invention has direct application to current moderate to high bypass ratio turbofan engines and can be incorporated with only modest structural changes in the engines. Incorporating this invention in a turbofan engine effects the engine cycle match characteristics in a manner similar to an increase in the fan exit nozzle area. When in operation, the system will cause an increase in the fan mass flow rate, relative mach number, bypass ratio and static thrust but will result in a decrease in fan pressure ratio, fan nozzle velocity, and cruise thrust. But since it is intended that this invention only be used during approach and take-off, cruise thrust will not be effected. Accordingly, it can be seen that a principal advantage of this invention is that it provides an appreciable reduction in both rotor and stator noise without effecting engine cruising performance.

This invention is applicable to any turbofan engine and will require varying degrees of cycle rematch depending on the design bypass ratio of the engine. The invention should be most suitable for use on engines having a single fan stage and having a spacing of at least two rotor chords between the rotor and the stators. The invention may be applied, however, to multi-stage fans having alternate rows of rotors and stators where the spacing between the rows is at least one rotor chord.

SUMMARY OF THE INVENTION

In summary, this invention can be most broadly described as an improved nacelle for use with a turbofan engine wherein the improvement includes a means for unloading the rotor, for diffusing the flow between the rotor and the stators, for reducing the viscous flow at the rotor tips, and for bypassing a substantial portion of the rotor tip flow around the stators. The invention can be more specifically described as a nacelle for a turbofan engine which includes a means for ducting a portion of the air flowing through the nacelle out of the fan duct through the nacelle and into the atmosphere, said means having an entrance in the inner wall of the nacelle located upstream of the fan stators but downstream of the rotor a distance greater than one-fourth of the chord of the radially outermost rotor blade tips.

BRIEF DESCRIPTION OF THE DRAWINGS

FIG. 4 is a sectional view of a portion of a third embodiment of this invention wherein air is bypassed through a plurality of radially spaced openings in the nacelle wall into a bypass collector and the flow is controlled by a sliding ring moved by an actuator.

FIG. 5 shows a fourth embodiment of this invention wherein air is bypassed through a plurality of radially spaced openings into a bypass collector and the flow is controlled at each opening by a door positioned by an actuator.

FIG. 6 shows a side view of a portion of the inner nacelle wall looking from the outside with the outer nacelle wall removed, and a partial cut away view of the embodiment of FIG. 5.

FIG. 7 is a sectional view showing the embodiment of FIG. 5 is greater detail.

FIG. 11 shows an eighth embodiment of this invention including an annular bypass entrance and also shows a plurality of turning vanes mounted within the duct near the entrance.

FIG. 12 is a sectional view of the embodiment shown in FIG. 11 taken at 12—12.

FIG. 13 shows a ninth embodiment of this invention which involves a second bypass entrance located downstream of the first entrance and a pair of doors simultaneously controlled by a pneumatic actuator.

FIG. 14 shows the embodiment of FIG. 13 wherein the doors are in the closed position.

DESCRIPTION OF THE PREFERRED EMBODIMENTS

Figure 1:
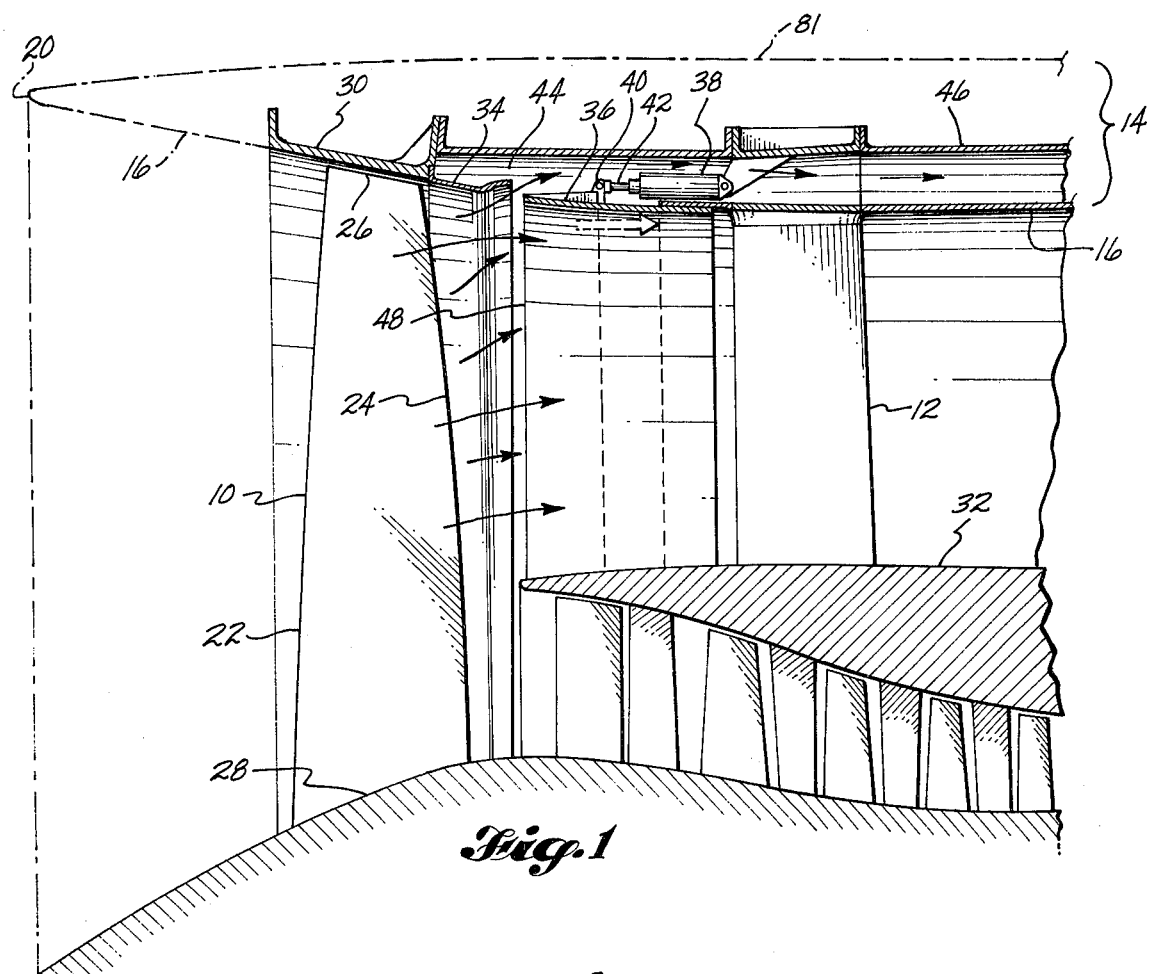
FIG. 1 shows a sectional view of the fan stage of a typical turbofan engine having a single rotor and a single set of fan stators, and also shows one embodiment of this invention involving a sliding ring door and a linear actuator attached thereto.

In discussing the various preferred embodiments of this invention, it should be understood that the term nacelle is used herein to describe the entire enclosure surrounding a turbofan engine and is intended to include other structural elements which commonly form a part of the internal flow surface, such as the fan shroud and the fan casing. The nacelle is further referred to as having an inner wall which forms a generally cylindrical duct into which air is drawn from the atmosphere and acted upon by the engine. The nacelle also has an outer wall which generally encloses the inner wall and forms the outer aerodynamic surface of the nacelle. The terms upstream and downstream refer to directions parallel to normal airflow to the engine. The axial direction is assumed to be a direction parallel to the axis of rotation of the rotor and the radial direction is perpendicular to that axis.

In designing a stator bypass system certain general considerations should be observed. First the system should be designed to bypass somewhere between five and fifteen percent of the total mass flow passing through the engine under normal operating conditions. It has been found that if the bypass flow is less than five percent little or no noise reduction is observed, whereas if the bypass flow exceeds fifteen percent the loss in fan pressure ratio and engine thrust becomes excessive. For the particular engines and models studied by the inventors, it was found that the optimum amount of flow to bypass was roughly ten percent. Of course, this figure should be expected to vary somewhat with different engines.

The duct entrance or entrances should be located on the inner wall of the nacelle between the rotor and the stator and should be symmetrically located around the nacelle if possible. Obstruction-free annular openings are most desirable from an acoustic standpoint but this may not be possible due to the engine structural requirements. In any event the number of obstructions in the duct entrance or entrances and through the rest of the duct system should be kept to a minimum to minimize pressure losses in the flow. The most desirable duct system would carry the flow from the duct entrance through the nacelle to the outer wall at a constant or accelerating velocity and would exhaust the flow axially rearward into the atmosphere. Because of nacelle structural requirements, or the location of equipment between the inner and outer nacelle wall, it may be necessary to collect the flow from the entrances in a series of plenum chambers, herein referred to as bypass collectors, located between the inner and outer nacelle walls before it is finally ducted to the atmosphere.

Generally, the duct entrances should be located as close to the stators as possible so that the nacelle wall aft of the rotor can be gradually curved to form the entrance. This gradual curvature is desirable because it will minimize the possibility of flow separation and associated pressure losses. The second reason for locating the entrances as far aft as possible is that the boundary layer of the secondary flow passing on to the fan stators will have only a short distance in which to build.

Under certain circumstances, though, it may be desirable to locate the bypass entrances further forward toward the rotor. The closer the entrances are to the rotor the greater the flow acceleration in the region of the rotor tips will be when the system is operating. Consequently, greater reductions can be obtained in secondary and viscous flow at the tips and greater reductions in both rotor and stator noise will result. Also, bypass openings positioned closer to the rotor will tend to capture the rotor tip flow earlier before it becomes dispersed radially inward in the duct passage resulting in the removal of a greater amount of turbulent flow from the secondary flow onto the stators.

With these factors in mind, the entrances to the stator bypass duct system can be placed to best suit a particular fan stage and particular noise reduction objectives. In any event, however, the forward edge of the duct entrances should be located downstream from the trailing edges of the rotor blades a distance greater than one-fourth of the chord of the radially outermost rotor blade tips for aerodynamic and acoustic reasons. Should the entrances be located closer to the rotor than this distance, flow disturbances emanating from obstructions in them may under some conditions propogate forward into the rotor, causing additional rotor noise.

As previously stated, the stator bypass system is intended to be used only during take-off and approach, so it is necessary that some means be provided in the system to close the duct when it is not in use. Of course, a wide variety of doors or valves may be adapted for this purpose and a selection of a suitable means for controlling the flow through a particular system should be obvious to those skilled in the art. A desirable type of a door would close a ducted entrance at the inner nacelle wall leaving the wall relatively smooth and unobstructed. When open, the door should also provide a relatively smooth entrance to the duct to minimize flow losses. It may also be desirable to optimize the system under certain set of operating conditions by controlling the mass flow through it; this can be easily accomplished by varying the opening of the doors or valves.

FIG. 1 shows a cross-section of a forward portion of a typical high bypass ratio turbofan engine including the fan stage. The engine has a single rotor 10 and a single set of fan stators 12 only one of which is shown in this view. A nacelle 14 has an inner wall 16, an outer wall 18, and an inlet lip 20 at its forward edge. Each rotor blade has a leading edge 22, a trailing edge 24, a tip 26 and a root 28. The entire rotor blade assembly is surrounded by fan shroud 30 and attached to a rotor shaft, not shown.

When the engine is in operation, flow enters the nacelle from the atmosphere at the left and passes through the rotor and is then divided into two portions by splitter 32. Flow passing radially inward of the splitter into the engine core is referred to as primary or core flow, and that portion which passes immediately outward of the splitter is called a secondary or bypass flow (not to be confused with the stator bypass flow which passes through the stator bypass system).

In this first embodiment, the entrance to the stator bypass duct system is a single annular opening formed by fairing 34 and an annular door 36 which is slidably mounted in the nacelle so as to be movable axially. The door is moved by a plurality of linear actuators 38 spaced radially about the periphery of the door, each being mounted to the nacelle connected to the door at point 40 by an arm 42 typically as shown. In this figure the door is shown in its most aft or open position wherein flow enters the stator bypass system by passing between fairing 34 and door 36 in the cavity 44. From there the flow moves aft into bypass duct 46 and is ultimately exhausted into the atmosphere (not shown).

Figure 2:
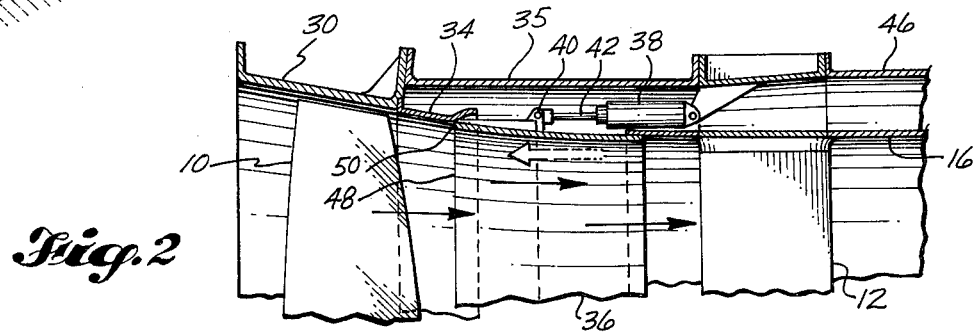
FIG. 2 shows a portion of the sliding ring door and linear actuator of FIG. 1 in greater detail.

FIG. 2 shows the embodiment of FIG. 1 wherein the door is at its most forward or closed position for cruising conditions. In this position, the forward edge 48 of door 36 rests against annular seal 50 which is attached to fairing 34. In order to optimize the amount of flow passing through the stator bypass system door 36 may be positioned at any intermediate position between open and closed on actuators 38.

Figure 3:
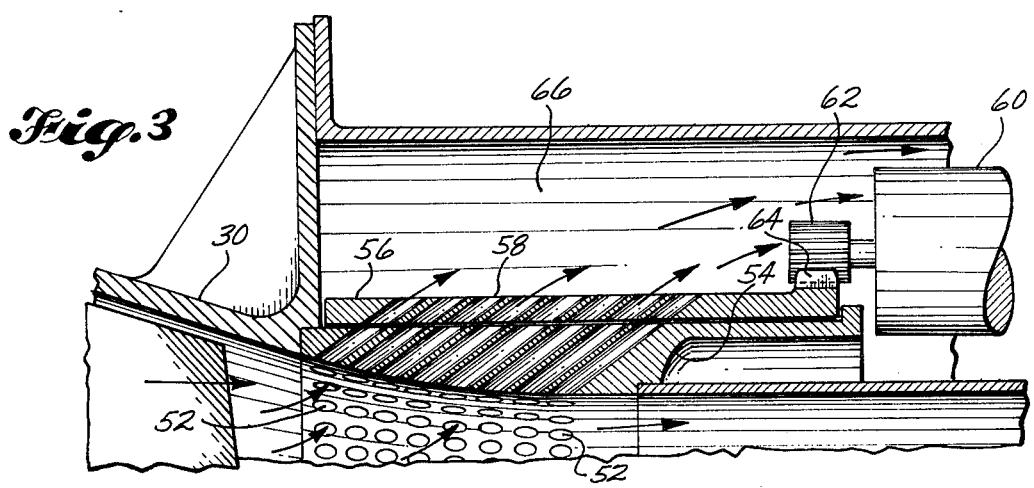
FIG. 3 is a sectional view of a portion of a second embodiment of this invention involving a rotating ring and a rotary actuator for moving the ring.

FIG. 3 a second embodiment of this invention is shown wherein the entrance to the stator bypass system- is formed by a plurality of passageways 52 which run diagonally and completely through annular member 54 as shown. Annular door 56 is concentrically fitted over member 54 and rotably mounted thereon. Passageways 58 passed diagonally through the door and are mated to passageways 52 in member 54. The door can be rotated by rotary actuator 60 which is mounted to the nacelle and drives the door through gears 62 and 64 the latter being formed as part of the door. When the door is rotated by actuator 60, so that passageways 58 and the door are aligned with passageways 52 in member 54, the bypass system is completely open permitting a portion of the flow in the nacelle to enter passageways 52 passed through passageways 58 in the cavity 66 from where it is ducted aft as shown by the arrows representing the direction of airflow and finally exhausted into the atmosphere (not shown). When not in use, the system is closed by rotating door 56 so that passageways 58 are no longer aligned with passageways 52. As with the first embodiment, flow through the bypass system can be throttled by moving the door to a position intermediate the open and closed position.

FIG. 4 illustrates an embodiment in which the entrance to the stator bypass system is formed by a plurality of passageways 68 passing through a section of the inner nacelle wall and forming a plurality of openings 72 radially spaced around the inner surface of that wall, similar to those employed in the embodiment of FIG. 3. In this embodiment, however, the flow is regulated by an annular door 74 which is slidably mounted for axial movement in the nacelle, similar to door 36 of the embodiment of FIG. 1. As in the first embodiment, the door is moved axially by a plurality of actuators 76 and in this view it is shown in the full open position. When the system is in operation, flow passes through passageways 68 into one of a number of bypass collectors 78, then continues aft through a flow control valve 80 into bypass passageway 82 and finally is ducted aft into the atmosphere by means not shown.

In FIGS. 5 through 7 a fourth embodiment is depicted in which the bypass entrances are formed by a plurality of relatively rectangular cutouts in the inner nacelle wall which are located symmetrically around the wall. Airflow through the system is controlled by a plurality of doors 86 one of which is located at each entrance 84. Each door is pivotally mounted near its forward end and bracket 88 and is controlled by a linear actuator 90, which is attached on one end to the nacelle structure and on the other to the door at point 92. When the doors are closed, the gaps between each door and the nacelle wall are sealed by seals 94. When the doors are in the open position as indicated by the dotted lines, flow passes from the fan duct into a plurality of bypass collectors 96 out through bypass passageway 98 and into the atmosphere.

In FIG. 6 a portion of the inner nacelle wall as viewed from outside the engine with the outer nacelle wall removed is shown. In the upper part of the figure the bypass collectors have been removed for clarity and in the lower half only the bypass entrances are shown.

Figure 8:
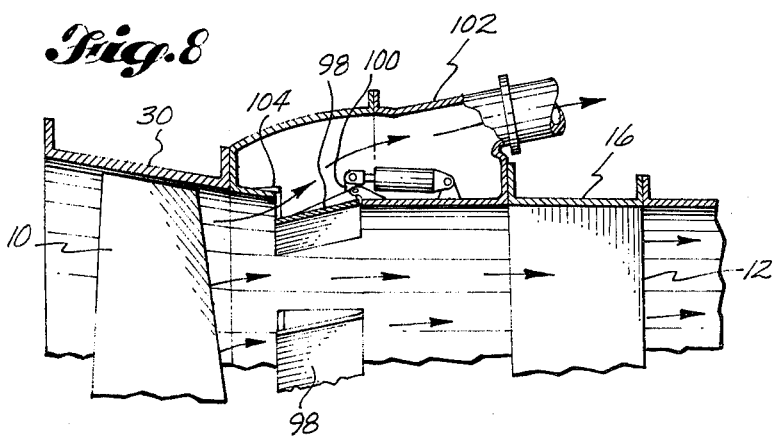
FIG. 8 shows a fifth embodiment of this invention in which the door to the bypass entrance opens inward toward the center of the engine.

FIG. 8 shows a mechanical variation of the previous embodiment wherein a plurality of inward opening doors are employed. In this device, doors 98 are pivotally mounted near their aft end 100 and act as scoops guiding the flow into a plurality of bypass collectors 102 when they are opened. The forward edge of each door includes a lip 104 which limits the maximum opening of the door.

Figure 9:
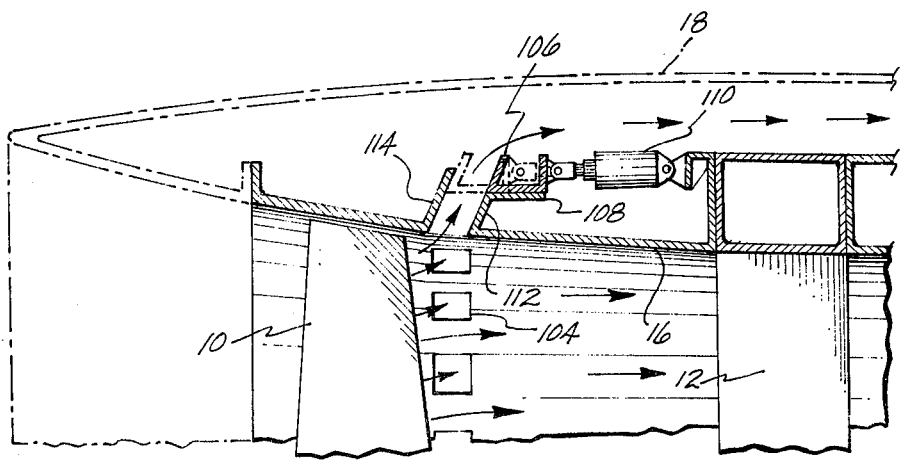
FIG. 9 depicts a sixth embodiment of this invention in which the flow through each bypass entrance is controlled by slidably mounted arcuate channel section moved by an actuator.

FIG. 9 illustrates an embodiment in which the bypass entrances 104 are radially spaced around the inner nacelle wall 16 and are relatively rectangular as shown in previous embodiments. The doors used in this configuration are a plurality of arcuate channel members 106 which are slidably mounted on a portion of the nacelle structure 108. Each door is controlled by a linear actuator 110 and is shown in this view in the open position. In this configuration the structural carry-over member such as member 35 shown in FIG. 2 has been eliminated and the structural integrity of the inner nacelle wall has been maintained by members 112 and 114. While some nacelle configurations may require a structure of this nature, it is somewhat less desirable from an acoustic and aerodynamic standpoint due to the relatively sharp cornered bypass entering and the irregularities in the inner nacelle wall when the system is closed.

Figure 10:
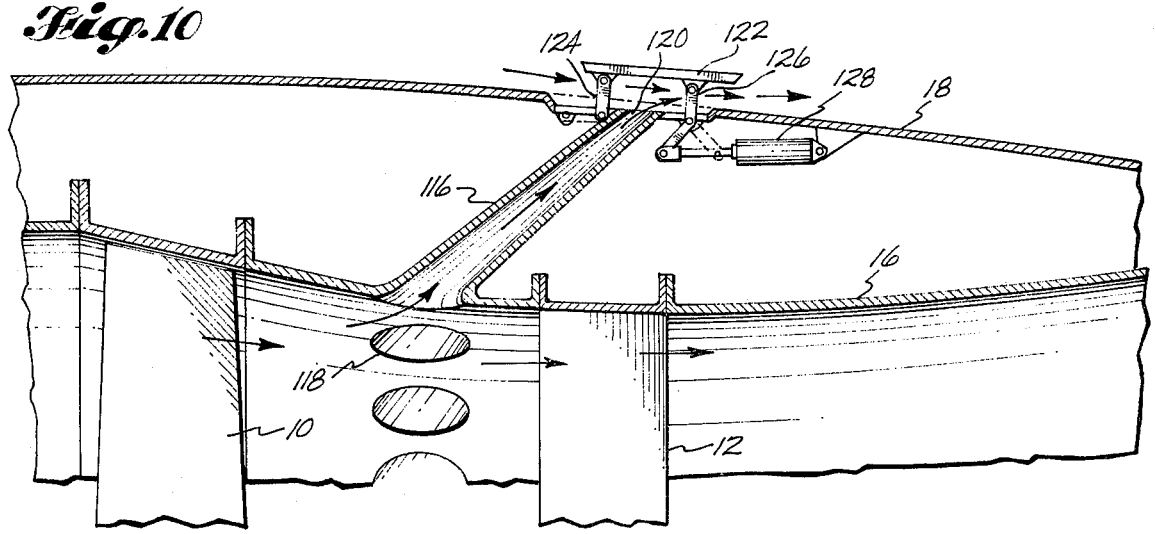
FIG. 10 shows a seventh embodiment of this invention wherein the flow through a bypass duct is controlled by a door pivotally mounted at the exhaust end of the bypass duct.

Another embodiment of this invention is shown in FIG. 10 wherein the bypass flow is ducted through a plurality of bypass passageways 116 each of which has an entrance 118 in the inner nacelle wall, passes entirely through the nacelle and has an exit 120 in the outer nacelle wall. Flow for each passageway is controlled by a pivotally mounted door 122 which is attached to the nacelle by pairs of links 124 and 126. The door is shown in the open position where it is spaced apart and relatively parallel to the outer nacelle surface causing ambient flow to pass between the door and the outer nacelle surface and mix with the exhausting bypass flow. Depending upon the exact door configuration and the extent to which it is open, a region of relatively low pressure can be created at the exit 120 which tends to draw the bypass flow through duct 116 at an increased rate. The door is positioned by actuator 128 and lays flush with the outer nacelle surface 18 when it is closed.

FIGS. 11 and 12 illustrate still another embodiment of this invention in which the bypass entrance is a single annular opening in the inner nacelle wall, and in which a plurality of turning vanes are situated radially around the nacelle just inside the duct opening. The purpose of the turning vanes is to take the swirl out of the flow and direct it radially outward to minimize energy losses. Flow entering the bypass duct system passes through the vanes, of which vane 130 is typical, and enters one of a number of bypass ducts 132 as indicated by the arrows. Each of the bypass ducts converges toward an exit 134 in the outer nacelle surface. In this particular embodiment, flow through each duct is controlled by a door 136 which is pivotally mounted at the forward edge of exit 134 and is moved by actuator 138. FIG. 12 is a sectional view taken at 12—12 in FIG. 11.

The final embodiment illustrated in FIGS. 13 and 14 differs from previously described embodiments in that the entrances to the bypass system are a number of pairs of rectangular openings radially spaced around the inner nacelle wall. In each pair, one opening is spaced directly downstream of the other. A typical pair of openings is formed by members 140, 142 and 144. Flow through the openings is controlled by a forward door 146 and an aft door 148 each of which is independently actuated. The aft door is attached to actuator shaft 150 which is moved axially by pneumatic actuator 152. Forward door 146 is attached to actuator shaft 154 which is situated parallel and behind shaft 150, and also passes through member 142 and door 148. Shaft 154 is moved axially by pneumatic actuator 156, not visable in these views, which is situated directly behind actuator 152. FIGS. 13 and 14 show the doors both in the fully open and closed positions, respectively, but it is understood that the doors may be moved independently.

One advantage of this particular embodiment is that it provides for a relatively smooth door entrance when open and a smooth wall contour when closed, while employing only a minimal amount of structure. In addition, it allows for variations in the bypass flow rate and the distance downstream of the rotor at which flow is removed from the nacelle. In optimizing the system, both of these variables are important. It has been found that stator noise reduction increases progressively as the bypass flow is increased, whereas rotor noise reduction initially increases but then decreases as the bypass flow is increased.

In other words, for any given set of operating conditions there is an optimum mass flow rate at which rotor noise reduction is the greatest. This optimum rate depends on the distance that the bypass entrance is located downstream of the rotor. The closer the entrance is to the rotor the lower the optimum bypass flow rate is for rotor noise reduction. It can be concluded then that where stator source noise is dominant (generally at low rotor speeds on approach) the maximum permissable bypass flow rate is desired. On the other hand where rotor source noise is dominant (generally at high rotor speeds on take-off) a smaller amount of bypass flow will optimize noise reduction. With these considerations in mind it can be seen that a double slot arrangement as described in this embodiment, having independently actuated doors, can be used to optimize the noise reduction for both landing and take-off conditions. On take-off flow can be drawn principally into the forward slots, and on landing a maximum bypass flow can be achieved by opening all doors.

Although only a specific number of embodiments of this invention have been illustrated and described, it is to be understood that obvious modifications may be made of them without departing from the true spirit and scope of this invention.

What is claimed is:

1. A nacelle for a gas turbine engine of the type known as a turbofan having a fan stage including a rotor having a plurality of blades and a set of stators spaced apart and downstream of said rotor, said nacelle having an inner wall which forms an annular fan duct for the passage of air through the engine, said nacelle comprising:

means for ducting a portion of said air out of said fan duct, through said nacelle and into the atmosphere, said means having an entrance in said inner wall located upstream of said fan stators but downstream of said rotor a distance greater than one-fourth of the chord of the radially outermost rotor blade tips; and, means for controlling the airflow through said means for ducting.

2. The nacelle of claim 1 wherein said means for controlling comprises:

a ring slidably mounted in said nacelle near said entrance; and, means attached to said ring for moving said ring axially.

3. The nacelle of claim 1 wherein said means for ducting includes a substantially cylindrical section having an inner wall which forms a portion of said fan duct, and an outer wall, and further having a plurality of passageways extending between said inner and outer walls of said section.

4. The nacelle of claim 3 wherein said means for controlling comprises:

a ring rotably mounted in said nacelle, concentrically surrounding said section and having a plurality of mating passageways; and, means for rotating said ring.

5. The nacelle of claim 3 wherein said means for controlling comprises:

a ring slidably mounted in said nacelle and concentrically surrounding said section; and, means attached to said ring for axially sliding said ring.

6. The nacelle of claim 1 wherein said means for ducting includes a bypass collector located within said nacelle and covering said entrance, and a bypass passageway providing communication between said bypass collector and the atmosphere.

7. The nacelle of claim 6 wherein said means for controlling comprises:

a door attached to the nacelle for sealing said entrance; and means for opening and closing said door.

8. The nacelle of claim 7 wherein said door is pivotally mounted at its forward edge and opens radially outward from the fan duct.

9. The nacelle of claim 7 wherein said door is pivotally mounted at its aft edge and opens toward the interior of the fan duct.

10. The nacelle of claim 1 wherein said means for controlling comprises:

an arcuate channel section slidably mounted in said nacelle; and, means attached to said channel section for axially moving the section between an open and a closed position.

11. The nacelle of claim 1 wherein said means for controlling comprises:

a door pivotally mounted to the outer surface of the nacelle, having a closed position in which it covers the downstream end of said ducting means and an open position in which the door is spaced apart from the outer nacelle surface and forms a channel in which ambient air passing over the outer nacelle surface is mixed with said portion of air exhausting from said ducting means; and, means attached to said door for opening and closing said door.

12. The nacelle of claim 1 wherein said means for ducting comprises a plurality of turning vanes mounted therein.

13. The nacelle of claim 1 wherein said means for ducting comprises a second entrance in said inner wall located downstream from the aforesaid entrance, but upstream of said fan stators.

14. The nacelle of claim 13 wherein said means for controlling comprises:

a pair of doors for closing said openings; and, pneumatically actuated means for opening and closing said doors.

* * * * *